Sept. 20, 1966  L. E. WOLINSKI  3,274,089
SURFACE TREATMENT OF POLYMERIC SHAPED STRUCTURES
Filed Oct. 21, 1963
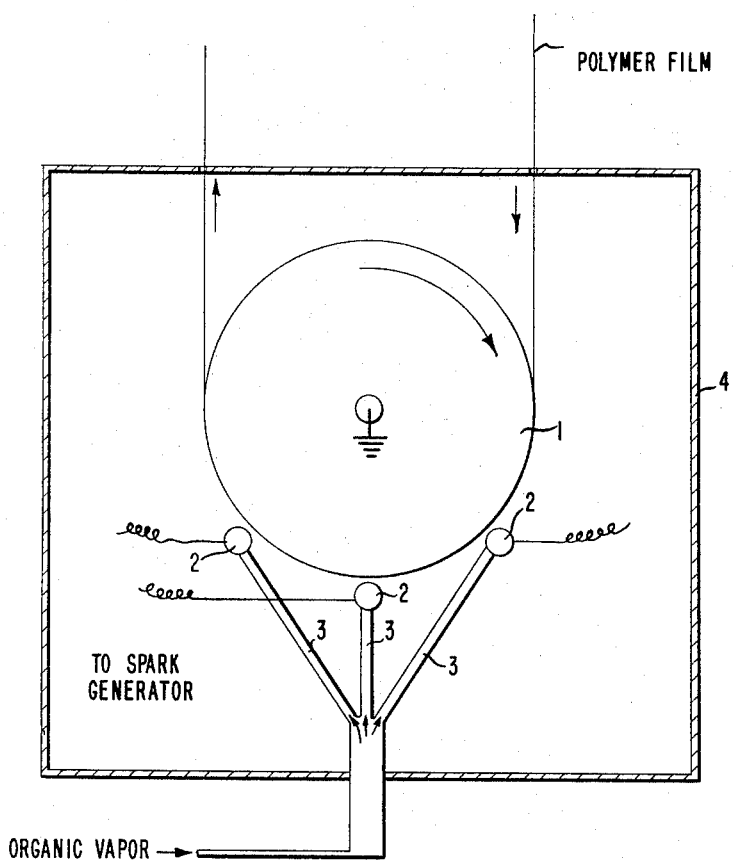
INVENTOR
LEON EDWARD WOLINSKI
BY
ATTORNEY

United States Patent Office

3,274,089
Patented Sept. 20, 1966

3,274,089
SURFACE TREATMENT OF POLYMERIC
SHAPED STRUCTURES
Leon E. Wolinski, Buffalo, N.Y., assignor to E. I. du Pont de Nemours and Company, Wilmington, Del., a corporation of Delaware
Filed Oct. 21, 1963, Ser. No. 318,149
7 Claims. (Cl. 204—165)

This application is a continuation-in-part of my copending application Serial No. 92,330, filed February 28, 1961, now abandoned.

This invention relates to polymeric shaped structures and particularly to a process for improving the surface properties of polymeric shaped structures.

The surface characteristics of polymeric shaped structures have an important bearing on their capabilities for being utilized in various commercial applications. For example, fluorocarbon polymers are well known for their resistance to most chemicals and solvents and as a consequence they are well suited for use as liners for pipes and vessels in which corrosive chemicals are transported or stored. However, these polymers suffer from an extremely low degree of adherability to all materials including low adherability to other fluorocarbon polymeric structures.

It is frequently desirable to apply a suitable dyestuff to the surface of such films as those made from polyvinyl fluoride, "Mylar"* polyester film or polyvinyl chloride polymers and copolymers, but it is observed that common dyestuffs have very low affinity for the surfaces of such shaped structures as these.

It is well known that films such as those from regenerated cellulose attain much greater utility through the application of suitable coatings to impart moisture-proofness, resistance to the passage of organic vapors and heat sealability. At present, it is necessary to provide various anchoring treatments, such as impregnation of the base sheet with reactive thermosensitive resins to afford adequate adhesion of the coatings to the base sheet. A simple means for achieving adherability of coatings would be most desirable.

In the case of polyolefin films, such as those from polyethylene, it is known to improve the adherability to various other substances such as adhesives, printing inks and the like by an electric discharge treatment. However, films not treated in this way, as well as those which have been treated, suffer from inadequacy of surface slip and, in some instances, heat sealability.

Many of the polymer films illustrated above have a strong propensity toward accumulation of static. A simple means for improving the various films in these several respects is a desired objective.

It is therefore an object of this invention to provide a simple and effective treatment which can be applied to the surface of polymeric shaped structures to afford improvements in surface properties in these diverse respects.

A more specific object of this invention is to provide a continuous and economically attractive process for surface treatment of organic polymer films whereby to modify and improve the surface characteristics of said films and thus provide films of enhance utility. These and additional objects will more clearly appear from the description which follows.

The foregoing and related objects are realized by this invention which, briefly stated, comprises subjecting the surface of a shaped polymeric structure to the action of an electrical discharge at substantially atmospheric pressure between spaced electrodes, in an atmosphere containing less than about 5% by volume of the vapor of an organic compound having a vapor pressure of at least 0.25 mm. of mercury at 60° C. in a gaseous carrier medium which will sustain the electrical discharge, said organic compound being selected from the group consisting of polymerizable organic compounds, non-polymerizable organic compounds having replaceable hydrogen atoms, and perhalohydrocarbons having a bond disassociation energy for the carbon halogen bond below 100 kilocalories, said electrical discharge having an average energy level below 15 electron volts, whereby to modify said surface. The permanency of the effect of this treatment is in general enhanced by applying to the freshly treated surface a polymeric coating, and/or by heating the treated surface.

In the preferred embodiment of this invention, illustrated diagrammatically in the accompanying drawing, a continuous web of preformed film, e.g., a continuous self-supporting film of polyvinyl fluoride or of a copolymer of tetrafluoroethylene and hexafluoropropene, is passed continuously between a set of spaced electrodes consisting of a rotating metal roll 1 which is connected electrically to ground, and one or more stationary hollow metal tubes 2 disposed parallel to the longitudinal axis of the roll and spaced a distance of from 0.03 to 0.125 of an inch from the surface thereof. The tubes, constituting the positive electrode, are each connected electrically to a suitable power source (not shown) which supplies an alternating (or pulsating direct) current of the required intensity at the required voltage and frequency. A gaseous atmosphere consisting essentially of the vapor of the organic compound as the sole active agent, admixed with a suitable carrier gas such as nitrogen or carbon dioxide, is fed continuously to the hollow interior of the electrode tubes through distributor ducts 3 and issues from the tubes, through suitable openings therein, at the gap between each tube and the roll. The electrical discharge takes place in the atmosphere containing the organic vapors. The vapors may also be introduced into the reaction zone through one or more tubes separate from the electrode assembly. The assembly just described is suitably enclosed in a chamber 4, held at substantially atmospheric pressure and provided with the necessary openings to facilitate maintenance of the atmosphere of carrier gas and organic vapor therein and to permit controlled exhaust of the vapors therefrom to minimize operational hazards. The treated film may be passed through a heating zone (not shown) and/or a coating apparatus (not shown) whereby to further condition the surface of the film to enhance the permanency of the effect of the treatment.

In carrying out the surface treatment of this invention the potential difference between the electrodes may vary from low voltages in the order of 1000 volts up to pulsating voltages of 100,000 and above. In general, however, it is preferred to maintain the voltage in excess of 2000–3000 volts. Frequencies from 350 cycles per second up to 500,000 cycles per second and above can be used. Frequencies in the range of 300,000 to 500,000 cycles are preferred in order to obtain effective treatment at commercially acceptable exposure times. While the current to the electrodes may range up to 5.5 R.M.S. (root mean square) amperes or more, for optimum results a range of from 0.3 R.M.S. amperes to 3.5 R.M.S. amperes is preferred. Power to the electrodes may range from 10 watts per lineal inch of the electrode length to 100 watts per lineal inch of the electrode length. The electrical discharge employed herein has an energy level below 15 electron volts, and is not to be confused with high or intermediate energy irradiations heretofore used in the treatment of polymeric surfaces.

The electrodes are preferably spaced from about .03 inch to about 0.125 inch. Useful results can be obtained ---
* Du Pont trademark.

when the electrode gap is as low as 0.015 inch to as much as 0.25 inch provided suitable adjustments in such features as amount of current, electrode dimension and exposure time are made. Time of exposure to the electrical discharge treatment is not especially critical and effective treatments are realized at exposure times as short as $1 \times 10^{-5}$ second and no adverse effects are noted at times as long as 60 seconds. Preferably the exposure time should not be less than $4 \times 10^{-4}$ second. For economic reasons exposure times as short as possible consistent with effective treatment would normally be employed.

As noted previously, the presence of organic vapor in the space between the electrodes is a vital requirement in this process. A further requirement is that the organic vapor be employed as a dilute solution in a suitable carrier gas. In general, the concentration of the organic vapor in the carrier gas should not be greater than about 5% by volume. At higher concentrations unsatisfactory surface treating of the preformed structure results. The carrier gas should have characteristics such that it does not interfere with the maintenance of a continuous electrical discharge between the electrodes. Some gases with too low a breakdown potential may permit excessive arcing across the electrodes; those with too high dielectric strength tend to repress the electrical discharge. Particularly suitable carrier gases are nitrogen or carbon dioxide. Such gases as hydrogen or helium are also operable.

Flow of the carrier gas/organic vapor mixture to the electrodes may be as low as one-half cubic foot per minute up to 10 cubic feet per minute. Higher flow rates can be used though economic considerations would dictate against use of amounts exceeding those required to produce the desired effects.

Any organic agent selected from the group consisting of polymerizable organic compounds, non-polymerizable organic compounds having replaceable hydrogen, and perhalohydrocarbons having a bond disassociation energy for the carbon halogen bond below 100 kilocalories and having a vapor pressure of at least one millimeter of mercury at 60° C. may be employed for purposes of this invention. Typical examples of suitable polymerizable compounds include glycidyl methacrylate, methyl methacrylate, acrylonitrile, cyclopentadiene, styrene, p-chlorostyrene, vinyl butyl ether, methyl vinyl ketone, vinyl acetate, 1-hexene and N-vinyl-2-pyrrolidone. Typical non-polymerizable compounds include xylene, hexane, cyclohexane, carbon tetrachloride, chloroform, tetrahydrofurane, diethyl sulfone benzyl alcohol and tetraisopropyl titanate. An important criterion is that the compounds have sufficient vapor pressure under conditions of use so that they can be volatilized. For non-polymerizable organic compounds, a prime consideration is that for most effective treatment the compound should have a replaceable hydrogen in its structure.

The treatment of this invention can be effectively applied to essentially any polymeric shaped structure. As representative polymeric shaped structures, the surfaces of which are susceptible to the treatment herein described, there may be mentioned shaped structures of perfluorocarbon polymers, vinyl fluoride polymers, vinylidene fluoride polymers, vinyl chloride polymers, vinylidene chloride polymers, vinyl acetate polymers, polyolefins such as polyethylene, polypropylene and polybutene-1, polystyrene, linear polyesters such as polyethylene terephthalate, polyamides, acrylonitrile polymers, acrylate and methacrylate polymers, polyurethanes, polycarbonates, regenerated cellulose, cellulose acetate, cellulose ethers, polyacetals, polyspiroacetals such as those derivable from pentaerythritol and dialdehydes, coumaroneindene resins, epoxy resin, phenol-aldehyde resins, ureaformaldehyde resins, melamine formaldehyde resins, isocyanate resins, protein plastics, etc. The treatment is applicable to any shaped structures, for example, films (both self-supporting and supported), fibers, and expanded structures, such as the foamed polyurethanes, vinyls, expandable polystyrene, cellular polyethylene, foamed phenolics, cellular cellulose acetate and foamed silicones and polyethers.

The permanency of the effect produced on the surface of the perfluorocarbon polymer structure by the electrical discharge treatment of this invention, i.e., the period of time that may elapse between the treatment and the effective application of the treated structure in the production of laminates and the like, is greatly improved by (1) heating the surfaces of the treated structure to a temperature of at least 150° C., for a period of at least one hour; or (2) by coating the surface of the freshly treated structure with a polymeric, and preferably an adhesive polymeric coating; or (3) by a combination of steps (1) and (2). Moreover, it has been found that a heat treatment, such as defined in step (1), serves to rejuvenate the adherability of electrical discharge-treated surfaces which have been stored for a long period of time prior to use.

The following specific examples of certain preferred embodiments will serve to further and more fully illustrate the principles and practice of this invention.

*Example 1*

A film 10 mils thick (36 inches wide) melt extruded through a hopper slot at 385° C. from a tetrafluoroethylene-hexafluoropropene copolymer (weight ratio 85/15) of the type described by Bro and Sandt, United States Patent 2,946,763, was passed at a speed of five feet per minute (contact time—$2 \times 10^{-2}$) between a pair of electrodes connected to a high frequency spark generator (Model H.F.S.G.-High Frequency Spark Generator), one electrode of which was stationary and the other was a rotating metal roll covered to a thickness of 20 mils with "Mylar" polyester film. The electrodes were spaced .04 inch apart and the power setting of the generator was set at 70, corresponding to a current of approximately 1.3 R.M.S. amperes to the electrodes at a frequency of about 350,000 per second and at voltages in the range of 10,000 to 30,000 volts, with pulsating peak voltages up to 100,000 volts. An atmosphere of glycidyl methacrylate (approximately 0.5% by volume) and nitrogen was maintained between the electrodes at substantially atmospheric pressure by passing a stream of nitrogen (approximately 4 cu.ft./min.) through liquid glycidyl methacrylate and conducting the exit gases over the electrodes. As the film advanced beyond the pair of electrodes a thin layer of deposit could be observed on its surface. A series of tests was then run to determine the adherability of the treated surfaces: A coating of epoxy resin ("Epon" 1004) dissolved in methyl ethyl ketone was sprayed on the surface of film treated as above described. The coated film carrying two grams of the epoxy resin per square meter was then passed through a 12-foot dryer maintained at 80° C., at a speed of 40 feet per minute. An adhesive mixture containing R-313 epoxy resin and about 1% of an amine-type hardener was then applied to the coated surface of the film and to the surface of a strip of cold rolled steel. The surfaces bearing the adhesive were pressed together for 20 minutes at 70° C. at a pressure of 75 pounds per square inch. The laminate was then cooled to room temperature and bond strength was measured on a Suter tester at a 90° peel. For comparison, a sample of treated film without the adhesive coating was laminated to the steel surface by heat and pressure alone. The results are shown in Table I.

TABLE I

| Hours [1] | Laminated Bond Strength (No adhesive coating) (g./in.) | Laminated Bond Strength Coated Surface (g./in.) | Control (Electric Discharge only) (g./in.) |
| --- | --- | --- | --- |
| 0 | 5,000–9,000 | 5,000–10,000 | 100–300 |
| 1,392 | Nil | 3,000 | |

[1] Aging time before making laminate.

In another test, a 2 mil thick layer of branched polyethylene was melt extruded at 280° C. onto the surface of the treated tetrafluoroethylene/hexafluoropropene copolymer film. A tightly bonded laminar structure was produced by heat sealing the polyethylene surfaces of adjoining composite layers. In a further experiment, an electrical circuit was insulated by placing the wires between two sheets of the treated film/polyethylene composite with the polyethylene surfaces adjacent to the wires and the whole was subjected to heat sealing temperature. In control experiments, the polyethylene layer showed essentially no adhesion to the tetrafluoroethylene/hexafluoropropene copolymer film when it was untreated.

*Examples 2–20*

Following the procedure used in Example 1, the following examples were carried out but with the compounds indicated below used in place of glycidyl methacrylate and with the various substrates used in place of the tetrafluoroethylene/hexafluoropropene copolymer. The treated films (each 6 inches wide) were tested for wettability, adhesive bond strength and for dyeability. The improvement in wetting was determined by measuring the contact angle as described below.

*Determination of contact angle.*—Contact angle in this specification may be defined as $\theta_a + \theta_r/2$ where $\theta_a$ is the advancing contact angle and $\theta_r$ is the receding contact angle. The procedure is as follows: Handling the film only with tweezers, a one-half inch by one-inch sample is washed briefly in deionized water and then similarly in methyl ethyl ketone, followed by drawing in a circulating air oven for about ten minutes at 60° C. After exposing the sample to a radioactive static eliminator and brushing off any dust with a small camel's hair brush it is placed in the center of the specimen platform of the contact angle goniometer. The contact angle goniometer consists essentially of a microscope mounted with its axis horizontal, equipped with a mechanical stage (the specimen block) that can be raised and lowered or moved from side to side. The normal eye piece of the microscope is replaced with a protractor eye piece which is divided into degrees on a rotating scale with a vernier in minutes on a fixed arm. The cross-hairs in the eye piece divide the field of view into quadrants. A drop of deionized water is pushed onto the film surface from a capillary dropper mounted above the stage. The capillary dropper is made from an ordinary eye dropper by drawing the tip into a one-inch long capillary with a diameter just small enough to prevent water from running out of the tube under gravitational force only. To assist in dispersing liquid from the dropper the tip of the capillary is ground about 30° off the perpendicular. The protractor scale is then revolved until its cross-hair is parallel to the surface on which the drop is resting. The other cross-hair is adjusted until it is tangent to the drop at the point of contact with the surface on which it is resting. The angle between the cross-hairs inside the drop is read from the protractor scale. This is the advancing contact angle. Using the capillary dropper, water is subtracted from the drop on the film sample and the receding contact angle is recorded. For both advancing and receding contact angles the drop perimeter must move and to insure this the drop is viewed as water is being added or subtracted. Due to water evaporation, an advancing water drop will begin to recede within about 30 seconds after it has stopped advancing. Therefore, the advancing contact angle must be measured soon after the drop perimeter has stopped moving. A receding drop may take as much as 30 seconds to come to equilibrium after subtraction of water has stopped. Since water evaporation merely causes more water loss and does not affect the receding contact angle it is best to wait about 30 seconds before taking this reading.

Improvement in adhesion was measured by determining peel values of film/film laminates by pulling the laminate apart on a Suter tester. The laminates were made by spreading X–7071 adhesive on the surfaces, and pressing the adhesive bearing surfaces together for 10 minutes at 120° C. and at a pressure of 75 pounds per square inch.

Surface dyeability was judged visually after subjecting the treated films to a 3% aqueous solution of ("Latyl" Red M.G.) dye for about two hours at 80° C.

The results of the treatments in the various examples are shown in the table below.

TABLE II

| Example No. | Substrate | Atmosphere | Contact Angle (°) | Adhesive Bond (g./in.) | Dyeability |
|---|---|---|---|---|---|
| 2 | TFE/HFP [1] | N₂/Toluene-2,4-diisocyanate | 24 | 4,920 | |
| | | Control [2] | 112 | 500 | |
| 3 | TFE/HFP | N₂/Vinyl Acetate | 40 | 4,820 | Good. |
| | | Control | 112 | 500 | Poor. |
| 4 | TFE/HFP | 2-vinyl Pyrrolidone | 33 | 9,000 | |
| 5 | TFE/HFP | N₂/Acrylonitrile | 36 | 6,300 | Good. |
| 6 | TFE/HFP | N₂/p-Chlorostyrene | 23 | 3,000 | |
| 7 | TFE/HFP | N₂/Xylene | 33 | 2,800 | |
| 8 | TFE/HFP | N₂/Hexane | 61 | 3,400 | |
| 9 | TFE/HFP | N₂/Carbon Tetrachloride | 50 | 4,000 | |
| 10 | TFE/HFP | N₂/Tetraisopropyl Titanate | 35 | 3,600 | Good. |
| 11 | Polyvinyl Fluoride | N₂/Glycidyl Methacrylate | 38 | 3,500 | Good. |
| | | Control | 75 | 500 | Poor. |
| 12 | Polyacrylonitrile | N₂/Vinyl Acetate | 36 | 4,800 | Good. |
| | | Control | 75 | 550 | Poor. |
| 13 | do | N₂/Styrene Sulfonic Acid | 37 | 4,500 | Good. |
| | | Control | 75 | 550 | Poor. |
| 14 | "Mylar" [3] Polyester Film | N₂/Methyl Methacrylate | 38 | 325 (sealed at 190° C.) | |
| | | Control | 72 | (No seal at 190° C.) | |
| 15 | Polyethylene | CO₂/Acrylonitrile | 45 | 2,500 | Good. |
| | | Control | 82 | 1,000 | Poor. |
| 16 | Regenerated Cellulose | N₂/Glycidyl Methacrylate | 70 | 6 seconds [4] | |
| | | Control | 45 | 2 seconds | |
| 17 | Polyvinyl Chloride | CO₂/Acrylonitrile | Surface wets | 3,500 | Good. |
| | | Control | Surface does not wet | 600 | Poor. |
| 18 | Polyimide (PMDA/POP) [5] | N₂/Styrene Sulfonic Acid | Surface wets | 4,000 | Good. |
| | | Control | Surface does not wet | 550 | Poor. |
| 19 | Polymethyl Methacrylate | N₂/Acrylonitrile | Surface wets | 3,000 | Good. |
| | | Control | Surface does not wet | 600 | Good. |
| 20 | Cellulose Triacetate | N₂/Acrylonitrile | | 3,500 | |
| | | Control | | 500 | |

[1] Tetrafluoroethylene/Hexafluoropropene copolymer.
[2] No treatment.
[3] Du Pont trademark.
[4] Wax pencil test, test and control film marked with wax pencil, immersed in water at 25° C., time for wax to loosen determined.
[5] Pyromellitic dianhydride/di-para-aminophenyl ether.

*Example 21*

A one-mil "Mylar" polyester film was treated in the apparatus of Example 1 in an atmosphere of nitrogen and DC-704 silicone oil. The resulting film when used as a dielectric in a high voltage generator showed enhanced resistance to degradation from exposure to corona.

*Example 22*

A polycarbonate film ("Lexan") was treated as in Example 21. The treated film likewise showed enhanced resistance to degradation from corona.

*Example 23*

A 1.5 mil polyethylene film was treated as in Example 21. The treated film had very much better surface slip than did an untreated control film.

*Example 24*

A one-mil "Mylar" polyester film was treated in the apparatus of Example 1 in an atmosphere of nitrogen and benzyl alcohol. The resulting film, heat sealed at 180° C., 20 pounds per inch pressure and 2 second dwell time, showed a bond strength of 400 grams per 1½ inch wide film strip whereas the untreated control film did not seal under these conditions.

It will be evident from the foregoing description and examples that the treatments of this invention, a variety of effects can be produced. For example, by this treatment the surface of the shaped structure can be made dyeable and thus surface dyeing effects can be realized without causing the substrata of the shape structures to be affected. Likewise, by the treatments of this invention a wide variety of adhesive can be used for forming laminates of shaped structures such as films to a variety of other shaped structures such as metals, other films from similar polymers as well as from dissimilar polymers. In some instances, it is possible following the treatment of a polymeric substrate by the process of this invention, the films can be sealed to themselves without the application of a separate adhesive. In a similar way, resistance of films to blocking and enhancement of properties such as gloss and freedom from haze and improved slip can be realized by such treatments as are illustrated in the examples. The adherence of coatings on such substrates as cellophane, for example, are enhanced by such treatments as are illustrated in the process of this invention. In still other effects, surface hardness or possibly surface softness, abrasion and mar resistance can be realized on various polymer surfaces. By treatments such as are described, certain films have a lower propensity toward development of static and similarly certain films which are good dielectrics but which may suffer from corona degradation are improved in this respect by treatments with such materials as silicones in an electric discharge. Improved barrier properties may be realized by these film treatments. At the energy level of the treatments of this invention the desired effects described above are realized without undesirable effects to the polymeric structures whose surfaces are being modified.

I claim

1. A process for modifying and improving the surface characteristics of polymeric shaped structures which comprises subjecting the surface of a polymeric shaped structure to the action of an electrical discharge maintained at a voltage in excess of 2000 volts and having an energy level below 15 electron volts, in a gaseous atmosphere at substantially atmospheric pressure consisting essentially of the vapor of an organic agent having a vapor pressure of at least one millimeter of mercury at 60° C., in a gaseous carrier medium which will sustain the electrical discharge, said organic agent constituting less than about 5% by volume of said atmosphere and selected from the group consisting of polymerizable organic compounds, non-polymerizable organic compounds having replaceable hydrogen atoms, and perhalohydrocarbons having a bond disassociation energy for the carbon halogen bond below 100 kilocalories.

2. A polymeric shaped structure treated by the process of claim 1.

3. The process of claim 1 wherein said shaped structure is a polymeric film.

4. A process for modifying and improving the surface characteristics of polymeric shaped structures which comprises exposing the surface of a polymeric shaped structure for a time of at least $1 \times 10^{-5}$ second to the action of an electrical discharge maintained at a voltage in excess of 2000 volts and having an energy level below 15 electron volts, in a gaseous atmosphere at substantially atmospheric pressure consisting essentially of the vapor of an organic agent having a vapor pressure of at least one millimeter of mercury at 60° C., in a gaseous carrier medium which will sustain the electrical discharge, said organic agent constituting less than about 5% by volume of said atmosphere and selected from the group consisting of polymerizable organic compounds, non-polymerizable organic compounds having replaceable hydrogen atoms, and perhalohydrocarbons having a bond disassociation energy for the carbon halogen bond below 100 kilocalories.

5. The process of claim 4 wherein said shaped structure is a polymeric film.

6. A process for modifying and improving the surface characteristics of continuous film which comprises passing continuous polymeric film between spaced positive and negative electrodes while maintaining between said electrodes an electrical discharge maintained at a voltage in excess of 2000 volts and having an energy level below 15 electron volts, and a gaseous atmosphere at substantially atmospheric pressure consisting essentially of the vapor of an organic agent having a vapor pressure of at least one millimeter of mercury at 60° C., in a gaseous carrier medium which will sustain the electrical discharge, said organic agent constituting less than about 5% by volume of said atmosphere and selected from from the group consisting of polymerizable organic compounds, non-polymerizable organic compounds having replaceable hydrogen atoms, and perhalohydrocarbons having a bond disassociation energy for the carbon halogen bond below 100 kilocalories.

7. A process for modifying and improving the surface characteristics of continuous polymeric film which comprises continuously passing a continuous polymeric film between parallel positive and negative electrodes spaced to provide a gap therebetween of from 0.03 to 0.125 of an inch, continuously applying to said positive electrode an alternating current of from 0.3 to 3.5 R.M.S. amperes at a voltage in excess of 2000 volts, and at a frequency in the range of 300,000 to 500,000 cycles per second effective to create an electrical discharge therebetween, and maintaining between said electrodes a gaseous atmosphere at substantially atmospheric pressure consisting essentially of the vapor of an organic agent having a vapor pressure of at least one millimeter of mercury at 60° C., in a gaseous carrier medium which will sustain the electrical discharge, said organic agent constituting less than about 5% by volume of said atmosphere and selected from the group consisting of polymerizable organic compounds, non-polymerizable organic compounds having replaceable hydrogen atoms, and perhalohydrocarbons having a bond disassociation energy for the carbon halogen bond below 100 kilocalories whereby to expose a surface of said film to the action of said electrical discharge and said gaseous atmosphere, said film being passed between said electrodes at a speed effective to expose a surface of said film to the action of said electrical discharge for a period of from about $1 \times 10^{-5}$ second to about 60 seconds.

References Cited by the Examiner

UNITED STATES PATENTS

| | | | |
|---|---|---|---|
| 2,935,418 | 5/1960 | Berthold et al. | 204—168 |
| 2,939,956 | 6/1960 | Parks | 204—165 |
| 3,068,510 | 12/1962 | Coleman | 204—165 |

JOHN H. MACK, *Primary Examiner.*

H. S. WILLIAMS, *Assistant Examiner.*